Patented Feb. 7, 1928.

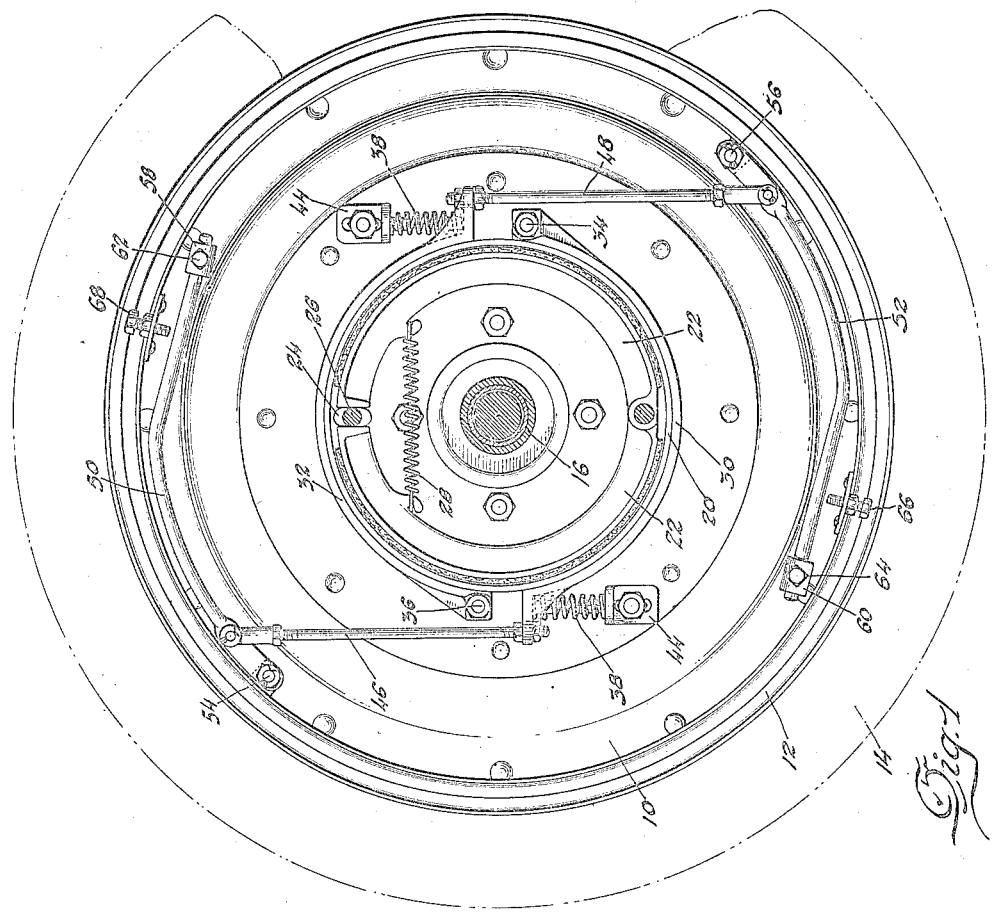

1,658,561

UNITED STATES PATENT OFFICE.

WILLIAM O. KENNINGTON, OF LONDON, ENGLAND, ASSIGNOR TO GENERAL MOTORS CORPORATION, OF DETROIT, MICHIGAN, A CORPORATION OF DELAWARE.

BRAKE.

Application filed July 16, 1923. Serial No. 651,834.

This invention relates to brakes and is illustrated as embodied in a brake mounted on the road wheel of a motor vehicle. A general object of the invention is to prevent skidding of the wheel, or any equivalent rotary member, by providing retarding means which has a minimum braking effect when the wheel is not rotating and which is tightened to increase the braking effect during rotation of the wheel. By such an arrangement, if the wheel skids and stops rotating, the brakes are automatically released so that they do not increase any tendency to skid, no matter how hard they may be applied.

From this point of view the invention may be regarded as comprising a brake which can be applied by the driver to any desired extent, but which is arranged to cooperate with parts which are centrifugally controlled so that no matter how hard the driver may apply the brake there is a definite maximum braking effect which cannot be exceeded and which is a function of the angular speed of the wheel. In one form, which is well suited for use in motor vehicles, the driver controlled braking connections operate on a ring which is concentric with the wheel and which is frictionally engaged by the centrifugally controlled parts. Preferably springs urge these parts against the ring with a force which is just sufficient so that skidding will not take place on the smoothest surface which is likely to be encountered, and the centrifugally controlled connections operate in the same direction as the springs to tighten these parts against the ring. I prefer that the tension of the springs be made adjustable so that the minimum braking effect may be varied for driving over different kinds of roads in different parts of the country.

In the form shown in the accompanying drawings, the brake includes a ring arranged as described concentrically of the road wheel, and within which are driver controlled expansible brake shoes of any suitable type. Semi-circular shoes are pivoted outside of the ring and are contracted against the ring by springs engaging their free ends, and the free ends are also engaged by connections from centrifugal levers which are pivoted adjacent the circumference of the wheel so that they may be made as light as possible and still exert a very considerable centrifugal force. Mounting of the centrifugal levers in this position permits making them a small fraction of the weight of centrifugal weights previously used, which were generally mounted immediately adjacent the axis of the wheel. Such lessening of the weight of the part is an important minor object of my invention, inasmuch as it is highly desirable that the weight of the wheel, as with all unsprung parts, be as small as possible.

Other objects and features of my invention, including an arrangement of limiting stops, and various other novel combinations of parts and desirable particular constructions, will be apparent from the following description of the illustrative embodiment shown in the accompanying drawings, in which:

Figure 1 is a side elevation of the wheel and its brake, the axle being shown in vertical section just inside the wheel; and Figure 2 is a rear elevation, partly broken away, looking from the left in Figure 1.

In the form selected for illustration, the brake is applied to a disk wheel 10 to which is secured a demountable rim 12 carrying a tire 14. The wheel is shown as being mounted on a rear axle 16 in any suitable manner. Confined between the wheel and a plate 18 carried by the axle is a floating ring 20, within which expansible brake shoes 22 are arranged to be expanded by a cam 24 carried by a rock shaft 26 operated from the service brake pedal, the emergency brake lever, or any equivalent controlling device. The shoes are urged inward toward their idle position by a spring 28 in the usual manner.

Outside of the ring 20 shoes 30 and 32 are pivoted respectively at 34 and 36 on opposite sides of the wheel. These shoes are normally held in frictional engagement with the ring 20 by springs 38 confined between flanges turned out at right angles from the ends of the shoes and brackets 44 adjustably bolted to the wheel by bolts passing through slots in the brackets as shown in Figure 1. The tension of these springs is so adjusted that the shoes 30 and 32 force the ring 20 to rotate with the wheel so long as the retarding effect of the shoes 22 does not exceed the friction between the tire 14 and the surface of the most slippery road which is likely to be encountered. Thus the springs 38 operate to limit the maximum retarding force which the driver controlled shoes 22 can apply to the wheel to an amount which will not cause the wheel to skid.

In order to provide for greater retarding force when the wheel is rotating at high speeds, without at the same time increasing the tendency to skid, the outturned flanges of the shoes 30 and 32 are connected by links 46 and 48 to centrifugal levers 50 and 52 pivoted respectively to brackets 54 and 56 carried by the wheel 10, and which are provided with adjustable weights 58 and 60. It will be observed that the links 46 and 48 are pivoted to the levers 50 and 52 a relatively short distance from the fulcrums of the lever, so that the weights 58 and 60, and the weights of the levers themselves, operate through a relatively long lever arm. It will also be seen that by pivoting the centrifugal levers near the circumference of the wheel, and arranging them to extend around the wheel just inside the circumference, comparatively light levers will exert a very considerable centrifugal force. This force being proportional to the mass and to the square of the velocity, the increase in velocity due to mounting the levers near the circumference of the wheel is very effective in increasing the centrifugal force, so that levers weighing only a few ounces exert more force than weights of several pounds mounted, as has heretofore been the practice, adjacent the axis of the wheel. The weights 58 and 60 are clamped on straight sections of the levers 50 and 52 by set screws 62 and 64 so that they may be adjusted along the levers to change the centrifugal force exerted on the brake at any given speed. Outward movement of the levers may, if desired, be limited to any given maximum by stops 66 and 68 adjustably threaded in fixed lugs.

In operation, the levers 50 and 52 apply to the shoes 30 and 32 a centrifugal force which is proportional to the square of the velocity, in a direction to cooperate with the springs 38 in urging the shoes 30 and 32 into frictional engagement with the ring 20. When the shoes 22 are expanded against the ring 20 by the driver, the maximum retarding effect which they can apply is determined by the friction between shoes 30 and 32 with the outside of the ring 20. That is to say if the driver applies the brakes as hard as he can, and the car is moving at a relatively low speed, the ring 20 will generally remain stationary with the shoes 22 and the retarding friction will be between the outside of the ring and the shoes 30 and 32. On the other hand if the brakes are not applied with any very great effort, and if the wheel is turning at a considerable speed, the ring will rotate with the shoes 30 and 32 and the retarding friction will be between the ring and the shoes 22. Thus the maximum retarding effect is entirely dependent on the speed of rotation of the wheel, and if the wheel skids, the centrifugal effect becomes zero and the maximum retarding effect is determined by the springs 38, which are purposely adjusted so that they do not cause skidding as explained above. Thus the driver can never apply sufficient force through the braking connection to lock the wheel and is thus able to secure at any time the maximum retarding force (which is exerted just before the wheel is locked) by simply exerting an excess of pressure on the brake pedal or equivalent controlling member. This excess pressure, as has been explained, serves to lock the ring 20, whereupon the braking of the wheel is effected by the centrifugal levers 50 and 52 and the springs 38 which automatically release themselves as soon as there is any tendency to lock the wheel. If stops 66 and 68 are provided, the weight of the levers may be such as to give maximum braking effects at relatively low speeds, e. g. 10 miles an hour, without danger of breakage of any of the parts at higher speeds.

While one particular embodiment of my invention has been described in detail, it is not my intention to limit its scope to that embodiment or otherwise than by the terms in the appended claims.

I claim:

1. A brake comprising, in combination, a rotary member, braking means including a floating ring and devices external thereto frictionally urged there against, centrifugally operated means connected to said devices for actuating the same and driver controlled brake shoes expansible into frictional engagement with the inside of the ring.

2. A brake comprising, in combination, a rotary member, a floating braking ring concentric therewith, means frictionally engaging the outside of the ring, centrifugally operated means for actuating the same, brake shoes inside of the ring, and driver controlled connections for expanding the brake shoes against the ring.

3. A brake comprising, in combination, a rotary member, a ring concentric therewith, pivoted brake shoes movable into engagement with the ring, springs urging the shoes against the ring, centrifugal devices also urging the shoes against the ring, brake shoes within the ring, and driver controlled connections for expanding the shoes into frictional engagement with the ring.

4. A brake comprising, in combination, a rotary member, a ring concentric therewith, a pair of semi-circular brake shoes pivoted at opposite sides of the ring, adjustable springs acting on the free ends of the shoes to contract them into frictional engagement with the ring, centrifugal levers and connections therefrom for contracting the shoes against the ring, and driver controlled expansible shoes within the ring.

5. A road wheel for a motor vehicle having a brake including parts which can slip with respect to one another, centrifugal levers pivoted adjacent the circumference of the wheel and extending around just inside the circumference of the wheel, and connections from the centrifugal levers for tightening said parts to resist slipping.

6. A road wheel having, in combination, a brake, centrifugal means to control the brake including a lever pivoted adjacent the circumference of the wheel, and means to limit the control by said centrifugal means to a desired maximum.

7. A road wheel having, in combination, a brake, a centrifugally-movable member controlling the brake, said member being pivoted adjacent the circumference of the wheel, and a stop to limit movement of said member.

8. A structure as defined in claim 6 with the means to limit the control adjustable.

9. A structure as defined in claim 7 with the stop adjustable.

In testimony whereof I affix my signature.

WILLIAM O. KENNINGTON.